US006856413B1

United States Patent
Roosen et al.

(10) Patent No.: US 6,856,413 B1
(45) Date of Patent: *Feb. 15, 2005

(54) USER INTERFACE FOR AN INFORMATION-PROCESSING SYSTEM

(75) Inventors: Monica M. W. M. Roosen, Bl Venlo (NL); Robertus C. W. T. M. Van Den Tillaart, Bj Gemert (NL)

(73) Assignee: Océ-Technologies B.V., Venlo (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,240

(22) Filed: Mar. 19, 1999

(30) Foreign Application Priority Data

Mar. 20, 1998 (NL) .............................................. 1008657

(51) Int. Cl.⁷ .............................. G06F 1/00; G06F 15/00
(52) U.S. Cl. ....................... 358/1.15; 707/102; 358/1.4; 358/1.13; 358/1.14; 358/1.15; 358/1.16
(58) Field of Search ................................. 707/100, 102; 358/1.9, 1.16, 1.13, 1.14, 1.15, 1.4; 399/27, 82

(56) References Cited

U.S. PATENT DOCUMENTS

| | | | | |
|---|---|---|---|---|
| 5,081,595 A | * | 1/1992 | Moreno et al. ............. | 395/111 |
| 5,113,355 A | * | 5/1992 | Nomura ..................... | 358/1.11 |
| 5,220,674 A | * | 6/1993 | Morgan et al. ............ | 395/800 |
| 5,493,408 A | | 2/1996 | Kurogane et al. .......... | 338/276 |
| 5,559,933 A | * | 9/1996 | Boswell ..................... | 395/114 |
| 5,727,135 A | * | 3/1998 | Webb et al. ................ | 395/113 |
| 5,787,237 A | * | 7/1998 | Reilly ........................ | 395/112 |
| 5,818,015 A | * | 10/1998 | Martin et al. .............. | 395/114 |
| 5,832,191 A | * | 11/1998 | Thorne ...................... | 358/1.15 |
| 5,873,659 A | * | 2/1999 | Edwards et al. ............ | 400/61 |
| 5,974,234 A | * | 10/1999 | Levine et al. .............. | 395/114 |
| 5,978,559 A | * | 11/1999 | Quinion .................... | 395/114 |
| 6,046,816 A | * | 4/2000 | Rawal et al. .............. | 358/1.12 |
| 6,115,132 A | * | 9/2000 | Nakatsuma et al. ....... | 358/1.14 |
| 6,335,795 B1 | * | 1/2002 | Neuhard et al. ........... | 358/1.15 |
| 6,348,972 B1 | * | 2/2002 | Taniguchi et al. ......... | 358/1.15 |
| 6,373,585 B1 | * | 4/2002 | Mastie et al. .............. | 358/1.15 |
| 6,453,127 B2 | * | 9/2002 | Wood et al. ................ | 399/8 |
| 6,469,796 B1 | * | 10/2002 | Leiman et al. ............. | 358/1.15 |
| 6,529,286 B1 | * | 3/2003 | King ........................... | 358/1.14 |
| 6,618,163 B1 | * | 9/2003 | Roosen et al. ............. | 358/1.15 |
| 6,678,068 B1 | * | 1/2004 | Richter et al. ............. | 358/1.15 |
| 2002/0036793 A1 | * | 3/2002 | Roosen et al. ............. | 358/1.15 |

* cited by examiner

*Primary Examiner*—Charles Rones
*Assistant Examiner*—Jacques Veillard
(74) *Attorney, Agent, or Firm*—Birch, Stewart, Kolasch & Birch, LLP (57) ABSTRACT

A user interface for an information-processing system having workstations for users and a number of printers on which it is possible to print files made at a workstation, all connected by a network. The print jobs of a user which have been sent to the printers are presented at his workstation in a list in combination with the name of the printer to which they have been sent. This applies to jobs which have not yet been or already have been finished in which the status of the job is also indicated. In this way a user can most efficiently direct his print jobs to an appropriate printer and thereafter track, via an actualized overview, all of his print jobs, their status and location. This permits a user to more readily find, control, and manage his print jobs.

15 Claims, 7 Drawing Sheets

USER INTERFACE FOR AN INFORMATION-PROCESSING SYSTEM

BACKGROUND OF THE INVENTION

1. Technical Field of the Invention

The invention relates to an information-processing system having at least one workstation for a user and a number of printers on which print files made at a workstation can be printed. The invention more particularly relates to improvements in user interfaces for such information-processing systems.

2. Description of Related Art

Information-processing systems having workstations and printers connected thereto are conventional. When a system of this kind is in use, it is frequently difficult for a user to remember the printer to which he has sent a specific print file. One possibility of finding a print job is inspection of the separate print queues utilized by conventional user interfaces, but this is a time-consuming task particularly with a large number of networked printers. In addition, print jobs which have been finished disappear from the print queue and then can no longer be found at all. The user then has no alternative but to go and physically inspect each printer to find his prints. This causes worker inefficiency as well as aggravation.

SUMMARY OF THE INVENTION

The invention meets the described need for an improved user interface enhancing user efficiency and improving the way in which information is collected, processed, and presented to the user permitting enhanced printer control.

The invention achieves these goals partially by the fact that the program operative in the workstation communicates with the printers to

- collect information concerning the status of print jobs of the user at a predetermined plurality of printers,
- update an actualized overview of the print jobs of the user, and
- present at the workstation screen the actualized overview of print jobs of the user, including, for each print job, at least an identification of the printer to which that print job has been sent.

In this way, the user can rapidly obtain an overview of all his outstanding print jobs and the printer to which they have been sent, even if they have already been finished.

In one embodiment of the invention the current status is given for print jobs which have not yet been finished. This can be in the following form: "waiting, in progress, has caused an error", or their serial number in their print queue. A status can also be given for print jobs which have already been finished. In that case the status will, for example, be in the form of the delivery tray in which prints have been placed, or "removed" if the printer detects, via with means known per se, that the delivery tray in which the prints were deposited has been emptied.

In a further embodiment, finished print jobs are not removed from the overview until the user selects them and gives them a removal command. This has advantages over automatic removal after a specific time. In this way the user can also use the list as a memory aid to remind him that he must fetch the prints of a specific job.

The overview of print jobs can be presented for a predetermined plurality of printers in the system, but also for all the printers. This can be set, for example, during configuration, but if required it can also be affected by selecting specific printers in a set-up procedure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3 to 13 show information windows displayed by the software according to the invention on the workstation screen.

DETAILED DESCRIPTION OF PREFERRED EMBODIMENTS

Figure 1:
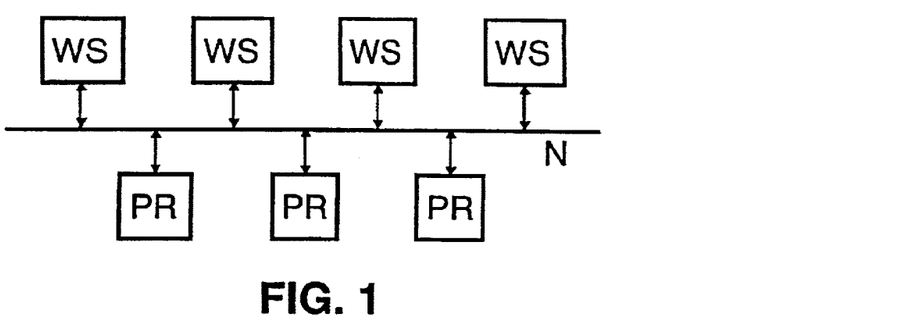
FIG. 1 shows an information-processing system in which the invention may be situated.

FIG. 1 shows a system of workstations WS and printers PR connected by a local network N. The workstations are, for example, PC's and are in each case equipped with a processing unit, a screen, a keyboard and a mouse. The printers are digital copying machines, each including a scanner, a printer, an operator control unit and a connection unit (Digital Access Controller or DAC) for connection to the network and processing print jobs sent from the workstations. In addition it is possible to use machines which only have a printer function but also have a control system adapted to the functionality described hereinafter. All these machines, copying machines and printers, are hereinafter referred to as "printer". Users wishing to have a specific data file printed from their workstation, can for the purpose choose from a number of, or even all, the printers of the system.

For the purpose of communication with the printers and the presentation of information relating thereto to the users, there is operative in each connected workstation a program which is hereinafter referred to as "desktop software". This program is personalized, i.e., it works on the instructions of just one user who on starting up has identified himself and input his authorization code.

The desktop software, hereinafter also referred to as "desktop" for short, is built up from a number of sub-programs diagrammatically illustrated in block 100 in FIG. 2. The core of the desktop software is formed by a sub-program indicated by VP "virtual printer", which communicates with the connected printers and updates the properties and status of each of these insofar as this is of interest to the workstation user. As will be explained in the following description, a user can choose how much information he wants to have presented concerning the state of connected printers and the printing files to be processed thereon and at what time. The exchange of data concerning these matters between the desktop software and the printers is limited to what is essential for the user's requirements. This prevents the network from being loaded more than is necessary and in addition the processing capacity of the workstation is not loaded more than necessary, since only the relevant information is present in the workstation and has to be processed.

The "virtual printer" program is provided with an operator control program, hereinafter referred to as "user interface" (UI), which controls the communication between the user and the desktop software in a manner understandable to the user, in the form of key strokes on the keyboard and windows on the screen, in which windows information is presented and in which the user can select and control the operation of elements via mouse movements. The desktop software is also provided with a communication program COM for controlling data transport from and to the printers via the network.

The desktop software may be previously stored in the workstations such as in RAM ("random access memory"), ROM ("read only memory"), PROM ("programmable read only memory"), etc. Alternatively, the desktop software may be stored in a storage medium such as a magnetic disc, optical disc, magneto-optical disc, etc. In another alternative, the desktop software may take the form of a signal propagating across the internet and/or network N and arriving at the workstation for storage and installation therein.

In other words, the invention disclosed herein may take the form of an article of manufacture or a propagating signal. As mentioned above, the article of manufacture is a computer-usable medium, having a computer-readable program code embodied therein wherein the computer-readable code causes the workstation(s) to execute the inventive methods. Similarly, a propagating signal can be used to embody the invention and program or otherwise transform the workstation into a special purpose machine executing the inventive methodologies.

Figure 2:
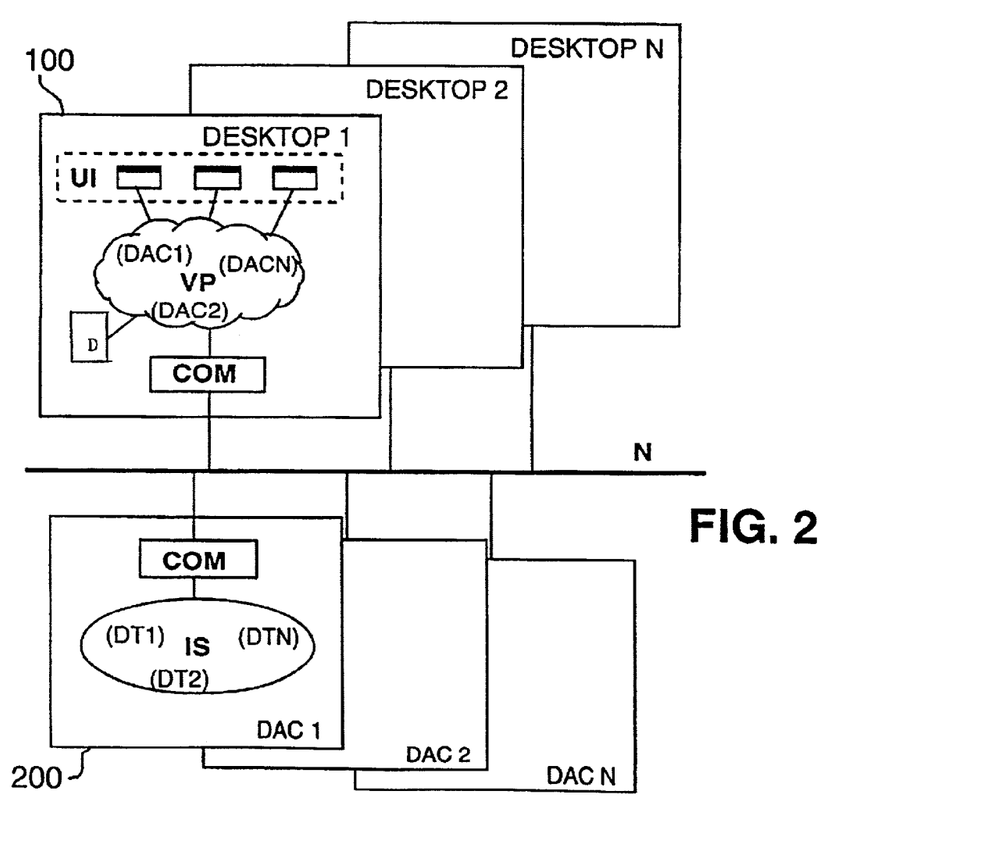
FIG. 2 is a diagrammatic overview of the software according to the invention.

A computer diskette such as disc D in FIG. 2 is an example of such a computer-usable medium. When the disc D is loaded into workstation(s), the computer-readable program code stored therein is transferred into the workstations). In this way, the workstation(s) may be instructed to perform the inventive methods disclosed herein.

Block 200 in FIG. 2 gives a diagrammatic illustration of the communication software in the DACs of the printers. This is formed particularly by an "information server" IS, which is intended to receive from and send to workstations digital information such as status information concerning the printer itself and the print jobs that the printer is processing. The information server updates data concerning the information required by each desktop and transmits only that information which is really required, and at the time at which it is required. The information server is also provided with a communication program COM for controlling data transport from and to the desktops via the network.

Files of digital data which are transmitted to a printer via the network for printing by the printer are either of a first or a second type. Files of the first type, hereinafter referred to as automatic print jobs, are required to be printed directly, i.e. without further action by an operator at the printer, while files of the second type, hereinafter referred to as interactive print jobs, must only be stored in the printer memory and must not be printed until an operator at the printer explicitly so requests thereby selection with the aid of the operator control means. An attribute added to the file shows the type of file involved.

Processing of a data file of the first type is referred to in this description as automatic printing (AP).

Processing of a data file of the second type is hereinafter referred to as interactive printing (IP). The procedure with this is as follows.

A data file for printing by interactive printing and transmitted by a workstation via the network is received by the DAC. This extracts from the file a number of predetermined identification data, such as the name of the owner and the name of the file itself. The file is then stored unchanged on a storage unit, e.g. a hard disk, in the printer, whereafter the machine passes to the stand-by state with respect to this job.

The DAC manages an administration system containing the identification data of all the data files for printing which are stored. If a new file is supplied via the network, the DAC adds the identification data thereof in the name of the owner/sender to the administration system.

The disk together with the administration system of the DAC form, as it were, a set of "logic storage spaces" for data files, each logic storage space being allocated to one user. Thus in actual fact storage in a user's logic storage space means that the file is stored on the disk and registered in the administration system in the name of that user. A logic storage space can be protected by a code specific to the owner/user, i.e. in practice an operator can obtain information over the files stored in a specific logic storage space only after he has input this code via the operator control means of the printer.

If an operator now wishes to have a specific interactive print file printed, then he must select that file by means of the printer operator control panel and give a print command by actuating a start key. In response thereto the data file is brought up from the disk and converted to printable data, which are processed by the printer to form a print. An interactive print file can be protected by the sender via a code. This code is in the form of an attribute to the print file. If a user wishes to print this file interactively, he must key in the security code at the operator control panel before the file is printed.

When a data file has been interactively printed, it remains in principle stored on the disk and registered in the administration system until it is removed by the user himself or by the printer manager.

The printer manager can bring the machine into a mode in which automatic print jobs are not accepted. In that case, incoming automatic print jobs are converted by the printer into interactive print jobs and stored on the disk.

As already stated, at least a number of the printers in this system are in fact digital copying machines, which can also make a copy of an original document by scanning it and printing the digital image data generated thereby.

There are, therefore, jobs which are started by a user at the machine itself (copy jobs and interactive print jobs) and jobs which are fed from a distance, e.g. from a workstation (PC) (an automatic print job). In the former case, the printer operates in a command-controlled mode in which the machine starts a reproduction process in response to a start command from the operator control panel, while in the latter case it operates in an autonomous mode in which the machine starts a reproduction process on its own initiative.

A user who has gone to the machine in order to start a job there by means of the keys finds it very frustrating if a remote-started automatic print job begins just before he wants to start his job. He then has to wait until the remote-started job is finished, or he must at least interrupt that job by means of an "interrupt" mechanism, before he can make his copy. This frequently occurs in practice, particularly at a machine which is frequently used, and results in annoyance and delay.

In order to protect the position of the user at the machine as much as possible, the machine passes into the command-controlled mode in response to a physical interaction by an operator at the machine, and/or remains there for a predetermined first waiting period. During this waiting period, the machine cannot pass into the autonomous mode. This offers the user at the machine the opportunity of creating, by any interaction, e.g. by actuating a key or placing one or more documents in the machine feed tray, time for himself in order to start his job unhurriedly.

In addition, on completion of the execution of a job in the command-controlled mode, the machine remains in the command-controlled mode for a predetermined second waiting time.

Thus, if the user wishes to process further copying or interactive print jobs, he will not be overtaken by an automatic print job. Also during the second waiting period, the machine cannot pass to the autonomous mode. The second waiting period can be equal to the first. A practical value for waiting periods is, for example, 30 seconds to 2 minutes.

The above-mentioned desktop software will now be described further.

The desktop software comprises the following modules:

An overview of all available connected printers with an indication of their status (hereinafter referred to as: Devices Overview)

An overview of current print jobs with the possibility of intervening in the settings for each job (hereinafter referred to as: Job Control)

Information provision concerning the progress of current print jobs (hereinafter referred to as: Job Monitoring).

The mode information presented by the three modules of the desktop software is dynamic, i.e. it is adapted directly as soon as there is any change in the presented mode.

It should again be noted that the desktop software is personalized and that the information provision and control possibilities are therefore directed towards the wishes of one specific user.

The three program modules referred to can be started from a general start menu which appears when the desktop software is selected on the workstation screen, and will now be described in sequence.

Figure 3:
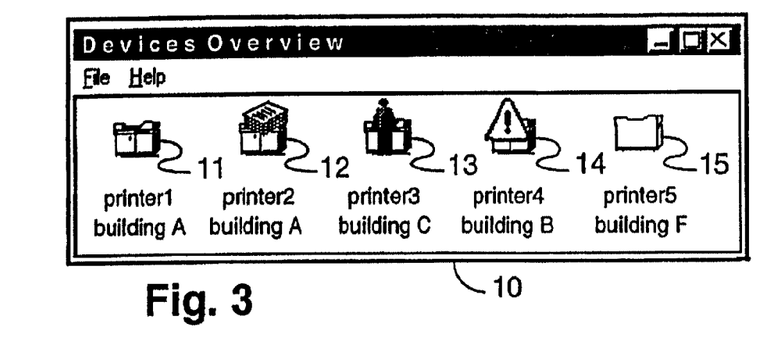

FIG. 3 shows a window 10 which is displayed on the workstation screen after the user has selected the option "Devices Overview" in the desktop software. This window displays for each printer a symbol indicating the status of that printer. Examples of this are shown in FIG. 3. In addition, each symbol has a short description of the printer so that it is clear which printer is involved.

A first symbol 11 is a stylized illustration of the printer. This symbol indicates that the printer in question is available for print jobs and is at the moment idle. A second symbol 12 shows the printer with a stack of papers over it and indicates that this machine is occupied with an automatic print job in the autonomous mode. Symbol 13 shows the printer with a person in front of it, to indicate that the machine is in the command-controlled mode and hence either occupied with a copy job or an interactive print job or is in the above-described first or second waiting period, in which no automatic print jobs can start. Symbol 14 is an illustration of the printer with, superimposed thereon, a notice board indicating that this printer is in a malfunction state. Symbol 15 is an undetailed illustration of the printer to indicate that this printer is connected but at the present time is not available for copy jobs or print jobs.

From these symbols a user can determine which printer he should send his print job to, and also, when he wishes to carry out a copying or interactive print job, whether the chosen machine is free. Particularly convenient is the differentiated indication of the occupied state, i.e. occupation in the autonomous mode and occupation in the command-controlled mode, because an automatic print job can without difficulty be stopped during operation by a user at the machine, in order to carry out a copy job or interactive print job in an "interrupt" mode, but passing another user at the machine will always require more convincing reasons.

The user can select one of the symbols, and hence one of the printers, and then call up one of the following functions either with a menu in the top bar of the window or with a pop-up menu or with the right-hand mouse button:

Displaying the waiting print jobs for the printer concerned; in this function automatic and interactive print jobs are displayed separately and they can also be manipulated. This function forms part of the "Job Control" program module and will be described in detail there. This function can also be called up with a double mouse click on the printer symbol.

Displaying the properties and status of the printer concerned.

Calling up a monitor function which during the work gives information on the display screen concerning the status of the printer concerned.

Defining the printer concerned as the default printer.

Figures 4A, 4B:
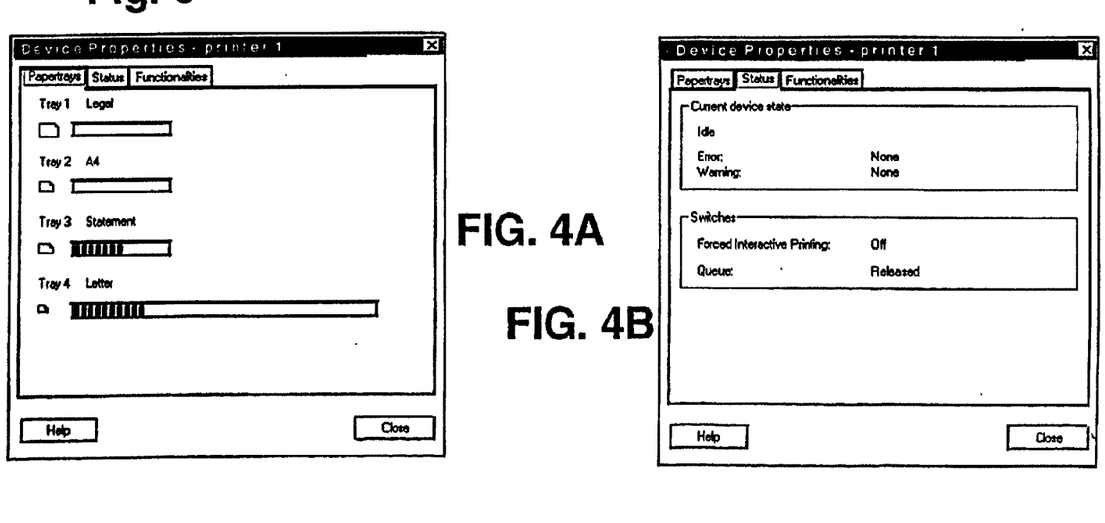
Figures 4C, 5, 6A, 6B:
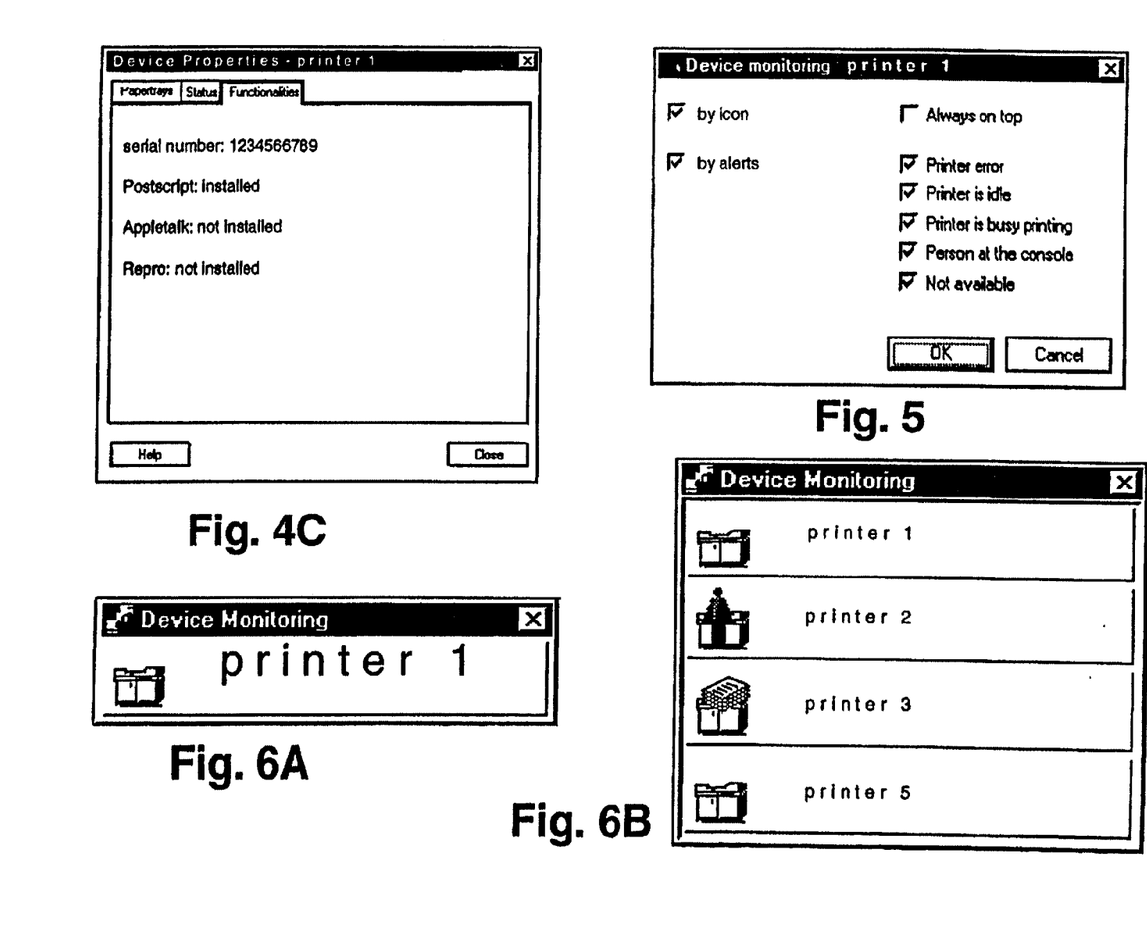

In the above-mentioned function in which the properties and status of the printer are displayed, a window with this information appears on the screen, the information being distributed over three tab cards which can be made visible by selection of their tab, as shown in FIGS. 4A, B and C. The stock of printing paper in the printer trays is displayed on a first tab card, the current state of operation of the printer is described on the second tab card and information as to the installed functionality is shown on the third tab card.

In response to selection of the above-mentioned monitor function, the workstation screen shows a window in which the user can set his preferences for the form of presentation of the printer status data (see FIG. 5). There are two main forms of presentation, namely with a permanent icon on the screen ("by icon") and with messages which appear on the screen at the time that a change of printer status occurs ("by alerts").

When monitoring with icons is set, the icon displays a symbolic illustration of the status just as shown in FIG. 3. An example of such an icon is given in FIG. 6A. A user can also simultaneously have the status of different printers maintained. In that case, the screen shows an icon for each monitored printer as shown in FIG. 6B. By a double click of the mouse on an icon the function of displaying the waiting print jobs for the printer concerned is called up. In this connection we would again refer to the description of the "Job Control" program module.

When monitoring via messages, the user can indicate the changes of state for which he wants to receive a message, in order thus to avoid unnecessary reports. An example of a message of this kind is displayed in FIG. 7.

Figure 8:
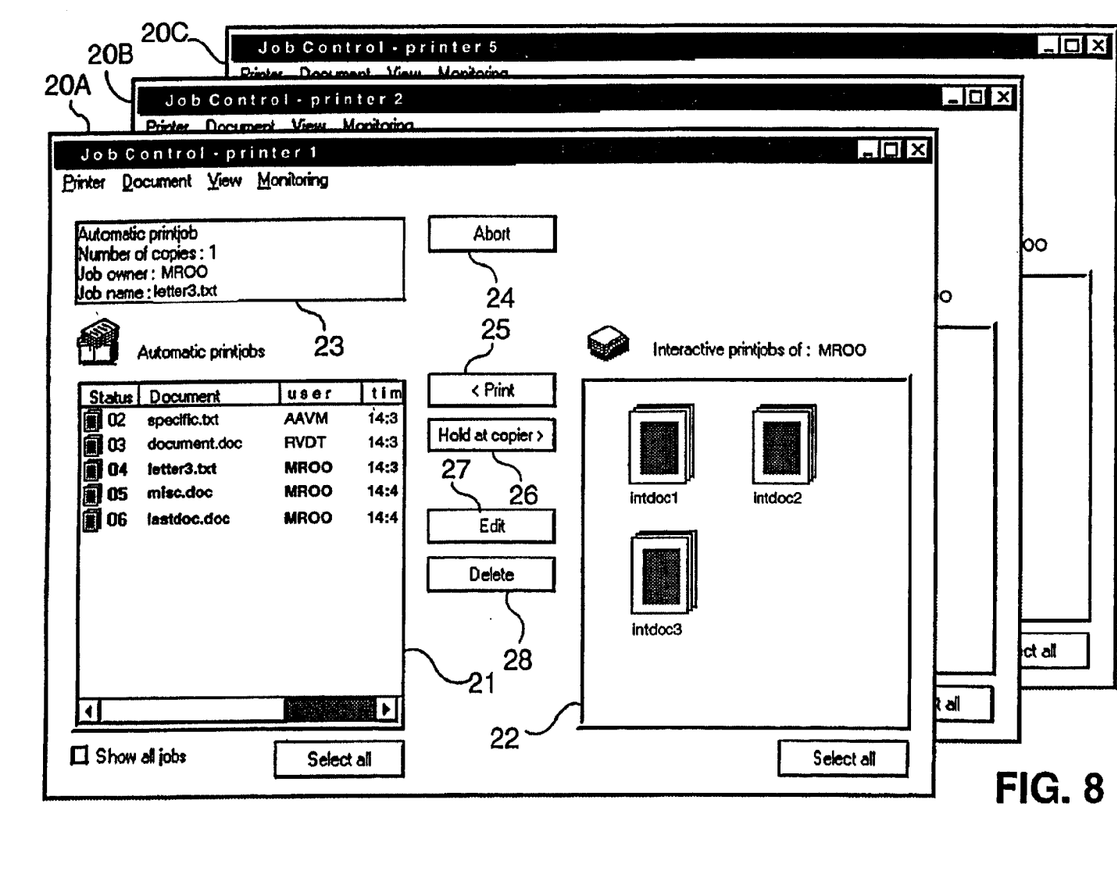

FIG. 8 shows the relevant layout of the workstation screen after the user has selected the "Job Control" option in the desktop software to maintain an overview of current print jobs.

Here a number of windows 20A, 20B and 20C are displayed, each applicable to a printer at which a print job of the user is present at that time. Thus there are as many windows displayed as there are printers at which the user's print jobs are present at that time. If this function was called up from the "Device Overview" module, then only the window for the printer selected there would be displayed.

A window 20 contains a space 21 for automatic print jobs, a space 22 for interactive print jobs of the user, and a space 23 for specifying the active print job. There are also a number of "keys" which can be operated, for example, via mouse.

Space 21 contains the queue of automatic print jobs of the user, with their status (number in the queue), name, and other data to be selected by the user during set-up. By clicking on a switchbox on the left beneath the space 21 the user can also have displayed all the waiting automatic print jobs, i.e. including those of other users. In that case his own jobs are reproduced in a manner which is distinguishable from the others, for example in color. If the Job Control module is called up from the "Devices Overview" module, for a specific printer, the presentation of all the waiting automatic print jobs, i.e. including those of other users, is the default setting.

Space 22 contains an overview of waiting interactive print jobs of the user, here reproduced with icons with a name, which corresponds to the character of the jobs, which are not in a queue but do not become operative until the user starts them on the operator control panel. To obtain more information concerning these jobs, the user can also have them presented in a detailed list.

Space 23 displays the data of the print job which is active at that time, or, if there is no job active, the state of the printer ("idle", "error"). The space contains the following data: type of job (copying job, automatic print job, interactive print job), number of prints, name of the owner of the job, and the name of the job. Next to the space 23 is a key 24, by means of which the active job can be discontinued ("abort").

By actuating key 25, an interactive print job selected in the space 22 can be converted to an automatic print job and be added to the queue in space 21, while the key 26 can convert an automatic print job selected in space 21 into an interactive job and move it to space 22.

By actuating key 27, the print settings can be displayed for a print job selected in either of the spaces 21 or 22. The same effect is achieved by double clicking of the mouse on the job name. In response to this, a window is opened on the screen of the workstation, displaying all the settings. The settings can also be changed in this window.

Finally, a print job selected in either of the spaces 21 or 22 can be removed by actuating key 28.

The above functions can also be called up by selecting a job and choosing from the "document" menu in the menu bar above the window 20 or by selecting in a pop-menu which appears when the right-hand mouse button is clicked on a job name.

The functions explained with reference to the keys 24–28 can be used by the user only for his own print jobs.

The "View" menu in the menu bar above the window 20 offers the following options:

Selection of the form of presentation of automatic print jobs (choice of which information is displayed)
  Selection of the form of presentation of interactive print jobs (as icons or in a list and, if a list is chosen, what information is displayed)
  Display of all print jobs of the user (over all the printers), with the printer on which the job is present, plus this information concerning the print jobs that have already been finished.

This latter function will now be explained with reference to FIG. 9.

When this function is selected, the screen at the workstation displays the window 30. This window 30 contains a space 31 in which there is displayed a list of all the print jobs which have not yet been finished for the user concerned, on all the printers, with their status (waiting, busy, error) and the printer at which they are present. This list shows both automatic and interactive print jobs and their type. Double clicking of the mouse on the name of a print job in space 31 opens the Job Control window (FIG. 8) of the printer where the job is present, so that the user can see the status of the job in the queue (if it is an automatic print job), can manipulate the job, and can inspect and/or change the print settings.

The window 30 also contains a space 32 displaying a list of all the finished print jobs of the user concerned, on all the printers, with the printer which processed them. A key 33 is provided beneath the space 32 to enable the user to remove from the list a print job after he has selected this by clicking with the mouse.

If a list is too long in space 31 or 32 to fit in that space, a scroll bar appears such that jobs not fitting in the window can still be reached.

Figure 9:
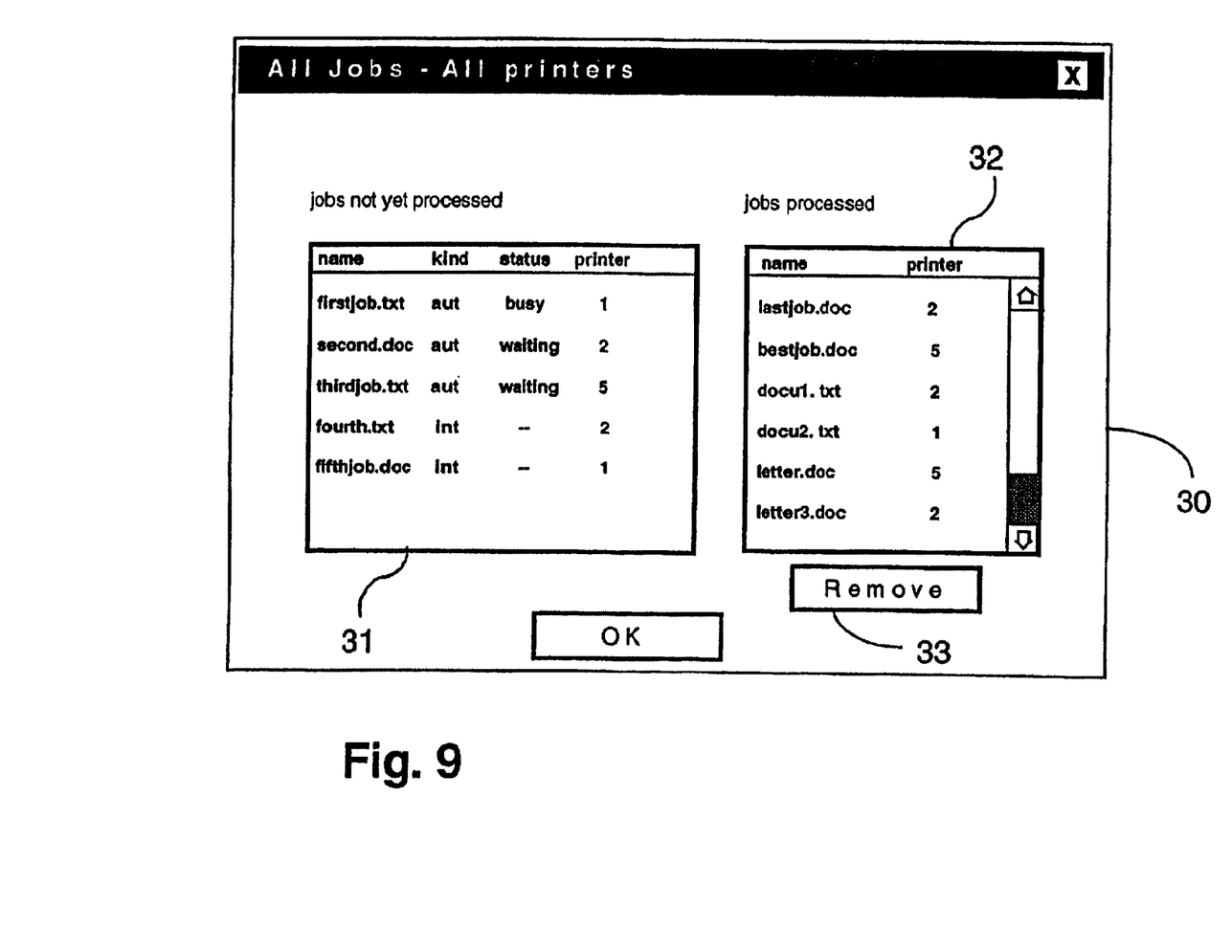

The list of finished print jobs in space 32 can also give a status indication although this is not shown in FIG. 9. In the case of a printer with more than one delivery tray, the printer machine control system knows the delivery tray in which the prints have been deposited and this information can be displayed in the list. The printer can also be provided with sensors to determine whether there are prints in the delivery trays. In that case, the machine control system can also note that a delivered stack of prints has been or needs to be taken from the tray. This information can also be displayed in the list in space 32. The status information can have the form of: "present in delivery tray X", or "removed".

Thus, a user can always find out where his print jobs are in the queue or where his prints are situated, this being extremely convenient particularly in an environment in which a number of printers are used.

The monitor function can also operate for just a specified sub-set of all the printers in the system. This can be set when the system is configured, or by using a set-up function of the program.

The "monitor" menu in the menu bar above the Job Control window 20 offers the opportunity of activating a monitor function for the print jobs of the user concerned on the printer concerned. This function can also be called up from the start menu of the desktop software and will be described hereinafter.

The monitor function is intended to keep the user informed as to the status of his automatic print jobs. It can be operative for all the current jobs or for some of the jobs, as selected by the user.

The monitor function has three modes:

A first mode ("active"): there is still at least one job of the set which has not been completed; also included is the number of jobs that have not yet been finished.
  A second mode ("passive"): all the jobs of the set have been finished or the set is empty.
  A third mode ("error"): one of the jobs has caused an error.

Figure 10:
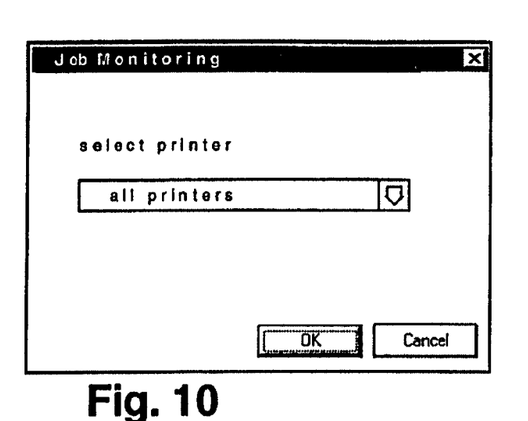

In response to the selection of the monitor function in the start menu of the desktop software, the workstation display screen displays a window in which the user can select one, more, or all the printers for the monitor function. This is shown in FIG. 10. After the user has clicked the "OK" key with the mouse, the workstation display screen displays a window in which the user can set his preferences for the form of presentation of the status of his personal print jobs (see FIG. 11). There are two main forms of the presentation, namely with a permanent icon on the screen ("by icon") or with messages which appear on the screen when there is any change in that status ("by alerts"). In the latter case, the user can indicate the changes of status for which he wants to receive a message in order thus to avoid unnecessary reports.

The user inputs his preferences and presses the "OK" key, whereafter the function is activated. An icon now appears on the screen if the icon mode was selected.

Figure 11:
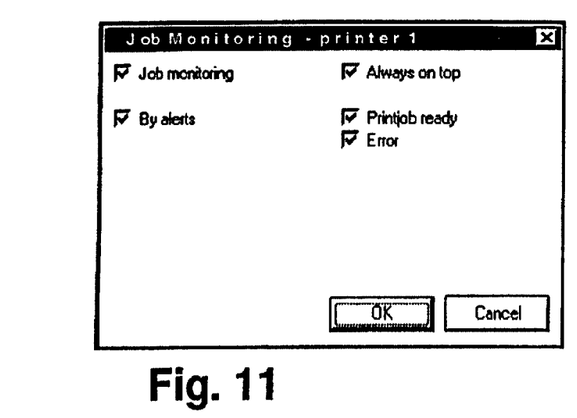

When Job Monitoring is activated from Job Control, the selection window of FIG. 10 is skipped (the printer of the Job Control window is automatically selected), but the window of FIG. 11 is immediately displayed.

Figures 7, 12:
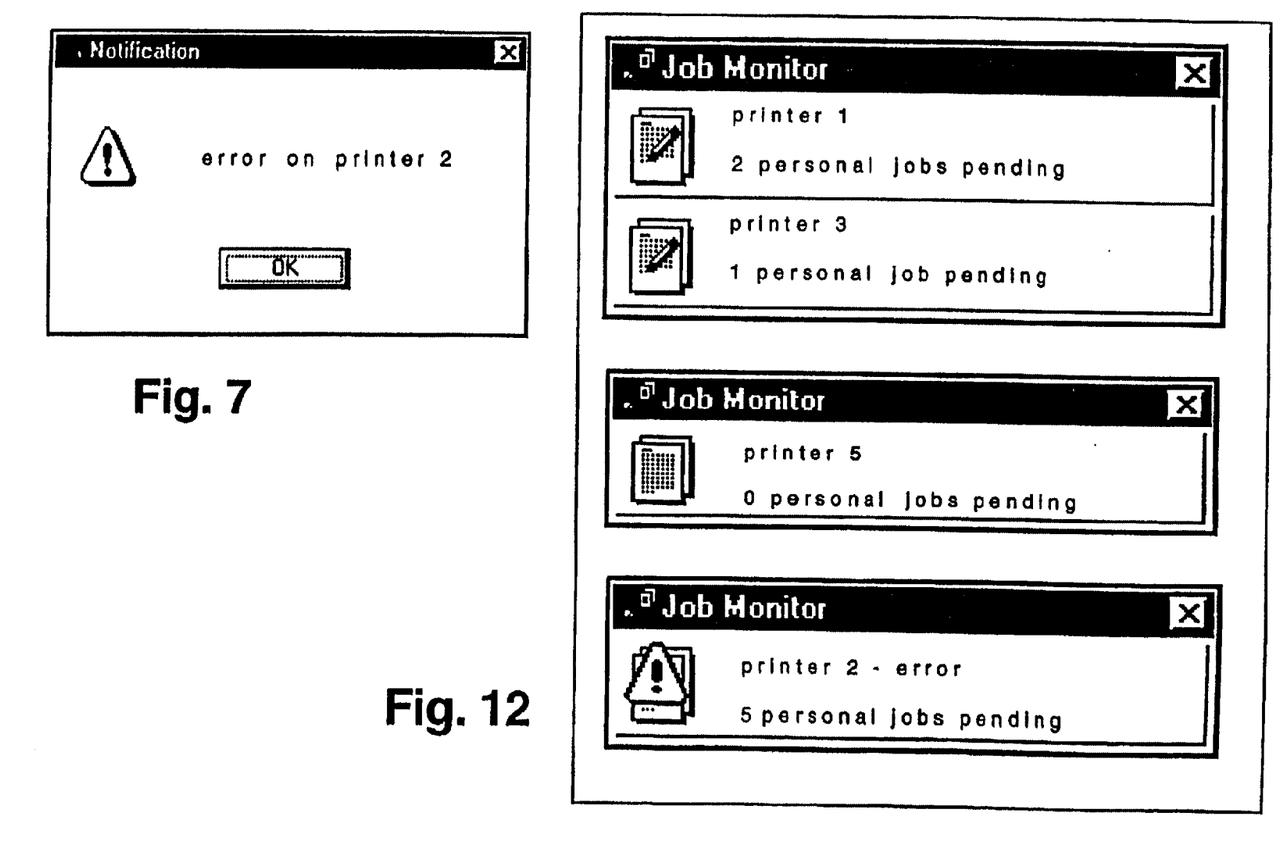

FIG. 12 shows monitor icons. In addition to the name of the printer for which it is active, an icon contains a symbol showing the status of a set of print jobs of the user on that printer. In this example, the following symbols are displayed for the above-mentioned three states: For the first state ("active"): an illustration of a document with a pen; For the second state ("passive"): an illustration of a document; For the third state ("error"): a notice board in front of a document.

The set of print jobs monitored by the monitor function can be the complete set of jobs on the printer concerned, but it can alternatively be a sub-set. This sub-set can only be selected in the Job Control window 20, space 21, by clicking the required print jobs with the mouse, followed by clicking the monitor menu in the menu bar. When Job Monitoring is called up from the start menu of the desktop software, the set always contains all the jobs. The monitor function is dynamic: print jobs can be added to a monitored set.

In response to a double click of the mouse on a monitoring icon, the Job Control window of the printer concerned is opened, so that the user can inspect the complete status of his jobs.

A plurality of icons can also be displayed simultaneously on the screen, so that the user can inspect the status of different sets or printers simultaneously.

Figure 13:
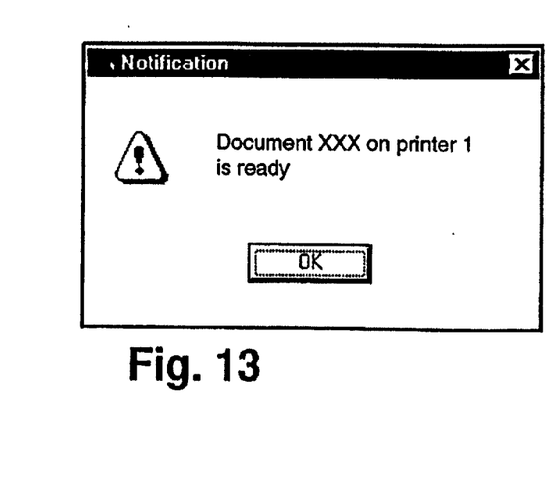

If the "by alerts" mode is selected, message windows appear only if there is a user-selected change of status of a print job from the set. An example of such a window is shown in FIG. 13.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. An information processing system comprising:
   at least one workstation in which a processor unit, a screen, and an operator-control device are operatively connected;
   a plurality of printers, each, provided with a control unit; and
   a digital network to which said workstation and said printers are operatively connected,
   wherein said workstation is provided with a program personalized for a specific user for communication with at least one of said printers for sending print jobs to said printer and for calling up or receiving status information from said printer,
   wherein said program includes
   means for collecting information concerning the status of print jobs of the specific user at a predetermined plurality of said printers,
   means for updating an actualized list of the print jobs of the specific user, and
   means for presenting at the workstation screen the actualized list of print jobs of the specific user, including, for each print job, at least an identification of the printer in which that print job is processed.

2. The system according to claim 1, wherein said program separately presents on the workstation screen a list of print jobs which have already been finished.

3. The system according to claim 2, wherein said program is provided with means for removing print jobs which have already been finished from the presented actualized list at a command by the user via the operator control device for a specified print job.

4. The system according to claim 1, wherein said program presents at the workstation screen a list of print jobs which have not yet been finished together with information as to current status thereof.

5. The system according to claim 1, wherein said program is provided with means for removing print jobs which have already been finished from the presented actualized list at a command by the user via the operator control device for a specified print job.

6. The system according to claim 1, wherein said predetermined plurality of printers comprise all of said printers connected to said digital network.

7. A method of interfacing with an information processing system having at least one workstation in which a processor unit, a screen, and an operator-control device are operatively connected; a plurality of printers, each provided with a control unit; and a digital network to which the workstation and the printers are operatively connected, the method comprising:
   providing the workstation with a program personalized for a specific user for communication with at least one of the printers for sending print jobs to the printer and calling up or receiving status information from the printer,
   wherein said program includes
   collecting information concerning the status of print jobs of the specific user at a predetermined plurality of the printers;
   updating an actualized list of the print jobs of the specific user; and
   presenting at the workstation screen the actualized list of print jobs of the specific user, including, for each print job, at least an identification of the printer in which that print job is processed.

8. The method according to claim 7, wherein said program separately presents on the workstation screen a list of print jobs which have already been finished.

9. The method according to claim 8, wherein said program removes print jobs which have already been finished from the presented actualized list at a command by the user via the operator control device for a specified print job.

10. The method according to claim 7, wherein said program presents at the workstation screen a list of print jobs which have not yet been finished together with information as to current status thereof.

11. The method according to claim 7, wherein said program removes print jobs which have already been finished from the presented actualized list at a command by the user via the operator control device for a specified print job.

12. The method according to claim 7, wherein the predetermined plurality of printers comprise all of the printers connected to the digital network.

13. An article of manufacture, comprising:
   a computer-usable medium including computer-readable program code means, embodied therein, for causing a workstation having a processing unit, a screen, and an operator-control device to perform a method of communicating with at least one of a plurality of printers having a control unit and operatively connected to the workstation via a digital network, for sending print jobs to the printer and for calling up or receiving status information from the printer, the computer-readable program code means including computer-readable program code means for collecting information concerning the status of print jobs of a specific user at a predetermined plurality of the printers;

computer-readable program code means for updating an actualized list of the print jobs of the specific user; and computer-readable program code means for presenting at the workstation screen the actualized list of print jobs of the specific user, including, for each print job, at least an identification of the printer in which that print job is processed.

14. The article of manufacture according to claim 13, wherein said computer-readable program code means for presenting presents separately on the workstation screen a list of print jobs which have already been finished.

15. The article of manufacture according to claim 13, wherein said computer-readable program code means selectively removes print jobs which have already been finished from the presented actualized list in response to a command from the user.

* * * * *